(12) United States Patent
Ali et al.

(10) Patent No.: US 7,076,628 B1
(45) Date of Patent: Jul. 11, 2006

(54) MICROPROCESSOR MEMORY SPACE ALLOCATION MANAGEMENT

(75) Inventors: Saqib Ali, Gaithersburg, MD (US); Zoran Mladenovic, Bethesda, MD (US); Bogdan Kosanovic, Bethesda, MD (US)

(73) Assignee: Texas Instruments Incorporated, Dallas, TX (US)

( * ) Notice: Subject to any disclaimer, the term of this patent is extended or adjusted under 35 U.S.C. 154(b) by 1103 days.

(21) Appl. No.: 09/605,421

(22) Filed: Jun. 27, 2000

(51) Int. Cl.
*G06F 12/00* (2006.01)
(52) U.S. Cl. .................. 711/170; 711/202; 711/210
(58) Field of Classification Search ............... 711/170, 711/1, 3, 210, 202
See application file for complete search history.

(56) References Cited

U.S. PATENT DOCUMENTS 5,493,652 A * 2/1996 Koufopavlou et al. ...... 707/206

6,253,212 B1 * 6/2001 Loaiza et al. ............... 707/202

* cited by examiner

*Primary Examiner*—Matthew D. Anderson
(74) *Attorney, Agent, or Firm*—Abdul Zindani; Wade James Brady, III; Frederick J. Telecky, Jr.

(57) ABSTRACT

A method for identification of memory assignment conflicts in the assignment of memory location addresses to a set of buffers. Programs run in embedded processors using buffers in a fixed storage space need to be mapped to addresses which do not overlap or create conflicts. The process of assigning start and end addresses for buffers can be tedious and error prone if performed without automation. The present invention presents a tool that automates the task of mapping the memory buffers and heaps to physical space. The tool utilizes a memory buffer allocation table created by the programer. The table designates the locations, sizes and overlays of all the buffers and heaps. The tool checks the validity of the memory map specified. If it is found to be invalid, the user is notified of the error. Otherwise, a memory table is created which will serve as "hooks" for runtime buffer manipulation.

1 Claim, 1 Drawing Sheet

MICROPROCESSOR MEMORY SPACE ALLOCATION MANAGEMENT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to memory management for microprocessors. In particular, the present invention relates to the management of scarce and sometimes overlapping memory space in microprocessor devices such as embedded processors and digital signal processors.

Memory management for DSP engineers is a significant bottleneck in the development process. Currently it is a tedious process in which an engineer often draws a picture of the available memory on a piece of paper and marks off the start addresses of where he/she would like to place the desired memory buffers. The list is made to determine the availability and conflict of the selection of memory locations. This process can be time consuming, tedious and error prone. Often times, when a mistake is made, it can only be discovered through very intensive debugging which may take days. Furthermore, pieces of paper often get lost, crumpled, etc. Sharing such pieces of paper with others (possibly in remote locations) may also be difficult. The need for a solution is urgent since these memory managing problems lie in the critical path of software development at this time.

SUMMARY OF THE INVENTION

The present invention presents a tool that automates the task of mapping the memory buffers and heaps to physical space. This tool is a Visual Memory Manager (VMM). Which has as its input a "recipe file" which is a memory buffer allocation table created by the user with a GUI linking tool such as Visual Linker sold by Texas Instruments as part of the Code Composer software set. This recipe file designates the locations, sizes and overlays of all the buffers and heaps. The VMM checks the validity of the memory map specified in the recipe file. If the memory map is found to be invalid, the user is notified of the error. Otherwise, a memory table is created which serves as "hooks" for runtime buffer manipulation. This tool eliminates the bottleneck of memory management and placement.

BRIEF DESCRIPTION OF THE DRAWINGS

For a better understanding of the nature of the present invention, reference is had to the following figures and detailed description, wherein like elements are accorded like reference numerals, and wherein.

DETAILED DESCRIPTION OF PREFERRED EXEMPLARY EMBODIMENTS

Figure 1:
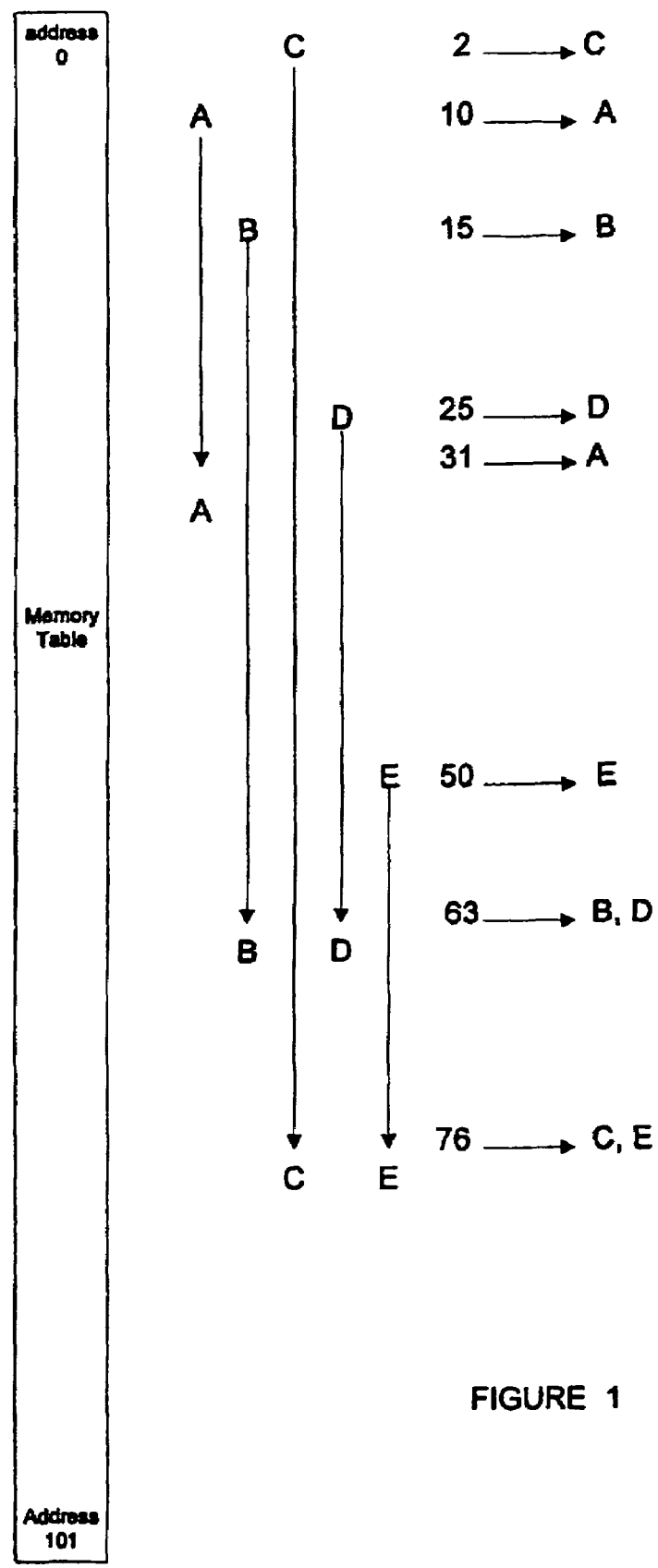
FIG. 1 is a functional diagram illustrating the steps for creating a scan list of the allocated memory buffer space.

It is common in a DSP build to have a large number of modules and buffers, sometimes several hundred in a single build. Each buffer will occupy memory space when the buffer is active. Data may be written or read from the memory space allocated to the active buffer. A simplified example is illustrated Table I below. The first seven exemplary buffers, A–E and the first 101 memory address locations are illustrated and disc used, an actual program implementing the present invention will have a significantly larger number of buffers and will utilize significantly greater memory space. As illustrated in Table I, buffer A for example may start at memory location 10 and run to memory location 30, buffer B may start at location 15 and run to location 62, as illustrated:

TABLE I

| Buffer | A | B | C | D | E |
|---|---|---|---|---|---|
| Start Address | 10 | 15 | 2 | 25 | 50 |
| End Address | 30 | 62 | 75 | 62 | 75 |

Once the address allocations for the buffers has been established by the programers, the present invention scans the memory allocations and addresses from the first memory address to the end of the available memory addresses and creates a scan list, as illustrated in FIG. 1.

The scanning produces an indicator each time a buffer is initially present and each time a buffer ceases to be present. For example, as the memory is scanned from at location 2, buffer C becomes present and a notation is recorded, as the scan continues, the beginning of buffer A is noted at 10 and the beginning of buffer B is noted at 15. The end of buffer A is noted at 31, not 30, because buffer A is still present at memory location 30. The remainder of the buffer detection notations are illustrated in FIG. 1.

A link list, linking the start and end of each buffer to a specified memory address, is created. From the link list, a Ordered List indicating the existence of overlapping buffers is created. The Ordered list for the example of Table I and FIG. 1 is illustrated below in Table II

TABLE II

| Memory Address | Buffers Present |
|---|---|
| 2 | C |
| 10 | A, C |
| 15 | A, B, C |
| 25 | A, B, C, D |
| 31 | A, B, C, D |
| 50 | B, C, D, E |
| 63 | B, C, D, E |
| 76 | C, E |

Through establishment of the interval table, the conflicts can be readily and visibly ascertained by the programer and managed. By tracking the beginning and ending of each buffer allocation, the present invention reduces the quantity of data needed for review. The programer does not need to review all memory locations, just those location when a buffer starts and/or stops. By establishing the table II above, the programer can visualize the conflicts. For example, a conflict exists between buffer B and buffer A beginning at memory location 15 and continuing until memory location 31. It is also easy to discern that a conflict between buffers D and E begins at memory location 50 and is resolved by memory location 63.

With respect to the implementation of the present invention in the application of the use of a Visual Linker GUI, the input to the VMM is a recipe file which the user will create using the Visual Linker GUI. As such, this GUI is used simply as means to create this input. Although the GUI was not created with this purpose in mind, the present invention teaches how to use it in this way. The Visual Linker GUI is used to create an unplaced memory region and to place that region in physical memory.

For the VMM to correctly interpret the contents of the recipe file, the programer declares conventions for specifying heaps, memory buffers, copy groups, etc with the Visual Linker GUI. The correct conventions specified herein are illustrative of a preferred exemplary embodiment. It will be apparent to one skilled that conventions can be changed to suit a specific implementation without departing from the invention concept taught herein. For the purposes of the exemplary embodiment, the implementation must be followed to correctly specify the aforementioned components. The convention is defined to create Visual Linker memory regions corresponding to different components of the exemplary memory management scheme.

Specifying Configuration Information:

To make judgements on the legality of buffer placement, heap placement and overlay specifications, the VMM will need some high level information regarding the entire build. This information is referred to as "Configuration Information". The user specifies this information in the Visual Linker GUI by creating a special top-level configuration symbol named "CONFIGURATION" in the exemplary embodiment. Certain information is specified within the comment field of this symbol. The VMM will extract this information and use it.

The configuration symbol provides the VMM with the following information:

The number of applications that exist.

The application names.

A mapping from application names to application IDs.

The module names.

A mapping from module names to module IDs.

Total number of module groups.

For each module group, which application it is part of, what the member modules are and how many instances of this module group exist.

Grammar:

The grammar that the user must follow to specify the above information is shown below in Table III. If this syntax is violated, the VMM will inform the user of an error.

The grammar in Table III is described in a BNF-like notation. The Symbol "::=" represents equivalency. It can be read as "expands to". The Symbol "|" represents disjunction. It can be read as "or". Symbols in Courier represent keywords. Symbols in <angle brackets> represent expressions that need further expansion according to the grammar. Symbols in <italics-angle brackets> represent expressions that need to be specified by the user. All white space in the configuration text is ignored. Anything between a "#" and the end of a line is interpreted as a comment and will also be ignored.

TABLE III

| | | |
|---|---|---|
| <Configuration> | ::= | <Application ID Translation Table> <Module ID Translation Table> <List of Definition of Module-groups> |
| <Application ID Translation Table> | ::= | Application Translation Table <List of Application Record> End Table |
| <List of Application Record> | ::= | <Application Record> \| <List of Application Record><Application Record> |
| <Application Record> | ::= | <Application Name> <Application ID>: |
| <Application Name> | ::= | <An alpha-numeric string of maximum length 30> |
| <Application ID> | ::= | <An 8 bit unsigned integer in ANSI -C hexadecimal format> |
| <Module ID Translation Table> | ::= | Module Translation Table <List of Module Record> End Table |
| <List of Module Record> | ::= | <Module Record> \| <List of Module Record><Module Record> |
| <Module Record> | ::= | <Module Name>, <Module ID>; |
| <Module Name> | ::= | <An alpha-numeric string of maximum length 30> |
| <Module ID> | ::= | <An 8 bit unsigned integer in ANSI -C hexadecimal format> |
| <Module-Group Definition List> | ::= | <Module-Group Definition> \| <Module-Group Definition> <Module-Group Definition List> |
| <Module-Group Definition> | ::= | Module-Group <Module-Group Name> Application: <Application Name>; <Instance specifier> End Module-Group |
| <Module-Group Name> | ::= | <An alpha-numeric string of maximum length 30> |
| <Instance Specifier> | ::= | <Instance count> instances of <Module List>; |
| <Instance Count> | ::= | <An 8 bit unsigned integer in ANSI -C decimal format> |
| <Module List> | ::= | <Module Name> \| <Module Name>,<Module List> |

Example Configuration Symbol:

The text of an example configuration symbol is illustrated in Table IV. This text is a member of the language described by the grammar in TABLE III. This configuration is for exemplary purposes and may not accurately reflect the modules, applications and module groups in any existing build.

TABLE IV

```
# Now for the Application ID Translation table:
Application Translation Table
#   System  0x00;           # This is Assumed
    Voice   0x01;
    Fax     0x02;
End Table
# Now for the Module ID Translation table:
Module Translation Table
    VCU     0x01;
    VAU     0x02;
    ECU     0x03;
    PIU     0x04;
    TDU     0x05;
    VPU     0x06;
    PVP     0x07;
    TSU     0x08;
    TTU     0x09;
    CID     0x10;
    ACU     0x11;
```

TABLE IV-continued

```
    DPU     0x12;
    FIU     0x13;
End Table
Module-Group Constant              # This module-group
    Application: System;           # is never
    1 instances of ACU;            # overlaid.
End Module-Group
Module-Group PCMVoice              # Voice
    Application: Voice;
        3 instances of VCU, VAU, ECU, PIU, TDU, VPU, PVP
            TSU, TTU, CID;
End Module-Group
Module-Group PacketVoice           # Voice
    Application: Voice;
        2 instances of PVP, VPU;
End Module-Group
Module-Group FaxGroup              # Fax
    Application: Fax;
        5 instances of PIU, DPU, FIU, ACU;
End Module-Group
```

Specifying Buffers:

Users of the VMM tool use the Visual Linker GUI to specify their buffer requirements. For each buffer they want to specify, they create a memory section in the Visual Linker GUI. This memory section is the GUI representation of the buffer being specified. This GUI object is referred to as the buffer-memory-section. The VMM interprets each such buffer-memory-section as a buffer request.

The user sets the buffer-memory-section's name to "CH<channel_ID>_<module group>$_{13}$<module>_BUF<n>" where n is an in sequence integer starting at 1 (refer to the definitions of channel, module group and module if necessary). Its size is set to the desired buffer size. The user sets the alignment requirement for the buffer-memory-section and then places it in physical memory. Additionally, the user may add up to four "tags" to the buffer-memory-section's comment field on separate lines:

"volatile" Presence of this tag indicates that this buffer is volatile.

"start_addr_prog"—Presence of this tag indicates that the start address is in program memory.

"ic_class_id=x"—Presence of this tag indicates that this buffer's Intra-Channel Class ID is x.

"mem_class=y"—Presence of this tag indicates that this buffer's Memory Class ID is y (legal values are DARAM, SARAM, ERAM IRAM (DARAM or SARAM) or HEAP).

The VMM has knowledge of certain relevant attributes of buffers specified in this way. These attributes—and how they are obtained from the GUI—are explained below:

Buffer Number:

An integer field that is extracted from the name of the buffer-memory-section that the user sets. This field is set to the n term from the name expression shown above.

Channel ID:

An integer field that is extracted from the name of the buffer-memory-section that the user sets. This field is set to the channel_ID term from the name expression shown above.

Module ID:

An integer field that is inferred from the name of the buffer-memory-section that the user sets. This field is set to the module ID taken from the Module ID Translation Table (see "Specifying Configuration Information") which corresponds to the module term from the name expression shown above.

Application ID:

An integer field that is inferred from the name of the buffer-memory-section that the user sets. This field is set to the application ID taken from the Application ID Translation Table (see "Specifying Configuration Information") which corresponds to the application that module group term from the name expression shown belongs to.

Size:

An integer field representing the worst-case size of the buffer in words. This field is set to the size that user set the buffer-memory-section to.

Memory Class:

An integer field with five possible values indicating weather this buffer should be placed in DARAM, SARAM, ERAM, IRAM (DARAM or SARAM) or HEAP. This field is extracted from the comments of the buffer-memory-section. If no mem_class tag exists for this buffer-memory-section, the Memory Class will default to HEAP.

Intra-Channel Class ID:

A 30 character alphanumeric label. It indicates membership/non-membership in an Intra-Channel Class. This designation is used to determine which overlays are legal. (see Overlay Classes below). Those buffers (and only those buffers) having the same Intra-Channel Class ID are members of an Intra-Channel Class. Members of an Intra-Channel Class must necessarily be a part of the same module, in the same module-group. This field is extracted from the comments of the buffer-memory-section. If no ic_class_id tag exists for this buffer-memory-section, the Intra-Channel Class ID will default to null (IE: not a member of any Intra-Channel Class).

Start Address:

This long integer field will indicate the start address of this buffer during execution. This field is set to the start address of the buffer-memory-section that the user has placed in physical memory. It is important that the user already have correctly set the alignment requirements of this buffer-memory-section in order to get a valid placement. The VMM will not check for this.

Start Address Program Flag:

This Boolean flag indicates weather the Start Address field mentioned above is in program or data memory. This field is extracted from the comments of the buffer-memory-section. If a start_addr_prog tag exists for this buffer-memory-section then the Start Address Program Flag is set to true. Otherwise, it will default to false.

Volatile Flag:

This Boolean field will indicate weather or not this buffer is volatile. If a buffer is designated to be volatile, it is understood to be a scratch buffer and may be overlaid by any other buffer. A non-volatile designation means that it cannot be overlaid unless overridden by a specific overlay class designation (see below). This field is extracted from the comments of the buffer-memory-section. If a volatile tag exists for this buffer-memory-section then the Volatile Flag is set to true. Otherwise, it will default to false.

Specifying Copy-Groups:

Copy-groups are collections of buffers that are copied/moved together. Every copy group has an execution and a store address. The execution address defines the location where the buffers is accessed from in real-time. The store address defines the location where the buffers is stored between real-time accesses. Buffers within the same copy-group may not overlay each other. One should not use copy groups unless there are multiple groups that share the same execution address. The VMM will generate warnings for all copy groups that do not share their execution address with any other copy group.

Buffers belonging to different copy-groups may be overlaid regardless of their Volatility Flag field. Users of the VMM tool will use the Visual Linker GUI to specify their copy-group requirements. For each copy-group they want to specify, they will create a memory section in the Visual Linker GUI. This memory section is the GUI representation of the copy-group being specified. We will call this GUI object the cg-memory-section. The user should set those buffer-memory-sections that correspond to buffers that are children of the copy-group in question to the children of the cg-memory-section.

For example: If cg-memory-section A is an on-screen memory section in Visual Linker corresponding to copy-group B, then the user should set the buffer-memory-sections corresponding to all the members of A to be B's children.

The VMM will interpret each such cg-memory-section as a copy-group request. The user must set the cg-memory-section's name to "CG_<label>" where name can be any alphanumeric string of length 27. The user must set the alignment requirement for the cg-memory-section. Additionally, the user may add up to four tags to the cg-memory-section's comment field on separate lines:

"one_way_copy" —Presence of this tag indicates only 1-way copying is required.

"exec_addr_prog"—Presence of this tag indicates that the execution start address is in program memory.

"store_addr=x" —Presence of this tag indicates that this copy-group'store address is x.

"store_addr_prog"—Presence of this tag indicates that the store start address is in program memory.

Below is a list of the copy group parameters stored by the VMM with an explanation of how they are obtained from the GUI.

Copy Group Name:

A 30 character alpha-numeric string field that is extracted from the name of the cg-memory-section that the user sets. This field is set to the label term from the name expression shown above.

Application ID:

An integer field which is set to the Application ID field of the first buffer-memory-section that is a child of this cg-memory-section. All other buffer-memory-sections in this cg-memory-section must have the same Application ID. If not, the Visual Memory Manager tool will alert the user of an error.

Memory Class:

An integer field with five possible values indicating weather this buffer should be placed in DARAM, SARAM, ERAM, IRAM (DARAM or SARAM) or HEAP. This field is set to the Memory Class field of the first buffer-memory-section that is a child of this cg-memory-section. All other buffer-memory-sections in this cg-memory-section must have the same Memory Class. If not, the Visual Memory Manager tool will alert the user of an error.

Size:

This integer indicates the size in words of the entire copy-group. This field is set to the size of the cg-memory-section in the Visual Linker GUI. The Visual Linker will already have computed the size of this cg-memory-section to be the sum of the size of all its children (and it will have adjusted appropriately for any alignment requirements of the children).

2-Way Copy Flag:

This field will indicate weather or not this buffer must be saved back outside of an internal memory region after it has been used. If this Boolean-value field is set, 2-way copying is implied. Otherwise 1-way copying is implied. An example of where 1-way copying may be useful is while using constants such as the codec table. This field is extracted from the comments of the cg-memory-section. If a one_way_copy tag exists for this cg-memory-section then the 2-Way Copy Flag field is set to false. Otherwise, it will default to true.

Execution Address:

This long integer is the address that the buffer is stored in when/if it is copied into internal memory. This field is set to the start address of the cg-memory-section in the Visual Linker GUI. It is important that the user already have correctly set the alignment requirements of this cg-memory-section in order to get a valid placement. The VMM will not check for this.

Execution Address Program Flag:

This Boolean flag indicates weather the Execution Address field mentioned above is in program or data memory. This field is extracted from the comments of the cg-memory-section. If an exec_addr_prog tag exists for this cg-memory-section then the Execution Address Program Flag field is set to true. Otherwise, it will default to false.

Store Address:

This long integer is the address that the buffer is stored in when/if it is copied out of internal memory. This field is extracted from the comments of the buffer-memory-section. If no store_addr tag exists for this cg-memory-section, the Store Address will default to Execution Address.

Store Address Program Flag:

This Boolean flag indicates weather the Store Address field mentioned above is in program or data memory. This field is extracted from the comments of the cg-memory-section. If a store_addr_prog tag exists for this cg-memory-section then the Store Address Program Flag field is set to true. Otherwise, it will default to false.

Overlay Scheme:

The user may place certain buffers/heaps in the same location using the Visual Linker GUI. This implies an overlay. The VMM will check the validity of overlays specified by the user against the following criteria. If any of the criteria are satisfied, then the VMM will allow the overlay. Otherwise, it will inform the user of an error. All information that the VMM requires to check the validity of overlays is entered by the user when the buffer-memory-regions and configuration symbols are created (in the Visual Linker GUI). The overlay rules are:

Application Overlay Criterion:

Any buffers that have the same Channel ID but different Application ID may overlay each other. An example of this type of overlay may occur in a scenario when two different applications exist: Voice and Fax. Assuming that both of these applications occur on the same channel, the buffers used by FIU (application: Fax) may overlay the buffers used by ECU (application: Voice). A caveat to this rule exists: buffers belonging to the System application (which has predefined application ID 0) may not be overlaid by any other buffers.

Intra-Channel Overlay Criterion:

Any buffers that have the same Intra-Channel Class ID may overlay each other. An example of this type of overlay may occur in a scenario when switching between two different codecs on the same channel during a call. Buffers of the two different codecs may overlay each other. Members of an Intra-Channel Class must be in the same module-group (and thus by definition also in the same application). If not, the VMM will inform the user of the error.

Scratch Overlay Criterion:

Any buffer which has its Volatile Flag field set can be freely overlaid by any other buffer which also has its Volatile Flag set. This type of overlay occurs in the scratch memory region.

Copy Group Criterion:

Any buffers that are members of different copy groups may overlay each other if the associated copy-groups have the same Application ID. The copy groups create the overlay at the execution address by construction. That is, the copy groups are intended to be used for generating such overlays that save internal memory space. For example, a typical copy group would have its execution address in internal RAM and the store address in external RAM (data or program). Another copy group within the same application would share the execution address if the program flow allows it. That is, the two groups are not accessed at the same time.

This type of overlay is similar to the Intra-Channel overlay except that in this case the execution and store addresses differ.

Specifying Heaps:

Certain buffers will not have statically pre-set base addresses. Instead their base addresses is allocated at run time from a designated heap. We call these special buffers heap buffers. Every module-group/channel combination must have a unique heap associated with it. Every heap buffer requested is allocated from the heap belonging to that module-group/channel combination.

An example may help clarify this point: Suppose there are 5 channels on a specific build; a fax module-group (application: fax) which has 3 instances and a voice module-group (application: voice) which has 5 instances. Each module-group/channel combination will have its own heap. So a heap buffer requested by the ECU module on channel 4 is allocated from the heap belonging to the voice-group on channel 4. Other modules from this channel and this voice group (and only those modules) will receive their allocations from that heap. All other requests for heap buffers is met with allocations from other heap(s).

Heaps themselves may overlay each other if both of the following two conditions are met:
1) The heaps are associated with same channels.
2) The heaps are associated with different applications.

In the case of heap buffers, it is unnecessary to provide the VMM with the buffers' base addresses since these is obtained at run time. However, the heaps (that these buffers are allocated from) themselves must be assigned a location and a size in much the same way as the buffer entities described above. So for each module-group/channel combination, the user will provide the base address and size of the associated heap. The user will explicitly specify this information in the Visual Linker GUI by creating a memory region representing the heap. This memory region is the size of the desired heap (see below) and placed at the desired location. The user must set this memory region's name to be: "CH<channel_ID>_<module_group>_HEAP."

The size of each heap will likely be contingent on the number and size of memory buffers that is allocated from it. It is recommended that each memory region representing a heap in the Visual Linker GUI be sized by inserting into it sub-regions representing each buffer that is expected to be allocated from that heap (these sub-regions should be of the form "CH<channel_ID>_<module group>_<module>_BUF<n>"). In this way, the heap's size is automatically computed by the Visual Linker GUI. The VMM will ignore all information regarding the buffers, however, this method is recommended to minimize errors and keep the concepts of heap allocation clear to the user. If this method is not adhered to, incorrectly sized heaps may result.

The present invention has been described in terms of implementation through the existing GUI Visual Linker, however, the present invention also teaches an GUI specifically for the task of memory management. This GUI allows easier specification, duplication, manipulation and examination of memory entities (buffers, heaps, copy groups) than the current Visual Linker GUI allows. This GUI may have some abilities for automating the actual placement of the buffers and/or some facility for informing users of the most MIPS-effective buffer placement scheme.

Because many varying and different embodiments may be made within the scope of the inventive concept herein taught, and because many modifications may be made in the embodiments herein detailed in accordance with the descriptive requirements of the law, it is to be understood that the details herein are to be interpreted as illustrative and not in a limiting sense.

We claim:

1. A method for identification of memory address allocation conflicts of a plurality of finite buffers within a defined memory space, comprising the steps of:

entering a list of said finite buffers and corresponding memory address allocations;

scanning said memory address allocations from a first memory address to a second memory address within said defined memory space;

creating a link list of primary memory addresses correlating to the start and end of each of said finite buffers;

creating an ordered list of said primary memory addresses and corresponding buffers which include said addresses from said link list of primary memory addresses.

* * * * *